United States Patent [19]
Miyahara

[11] 4,081,737
[45] Mar. 28, 1978

[54] SECONDARY BATTERY CHARGER AND HEATER

[76] Inventor: Hiroyasu Miyahara, 2435-9, Suehiro-cho, Honjo, Saitama, Japan

[21] Appl. No.: 690,876

[22] Filed: May 28, 1976

[30] Foreign Application Priority Data

Jun. 3, 1975 Japan .................................. 50-75472
Oct. 9, 1975 Japan ................................. 50-138745

[51] Int. Cl.² .......................... H02J 7/00; H05B 1/00
[52] U.S. Cl. .................................. 320/2; 219/10.57; 219/202; 219/209
[58] Field of Search ................... 219/10.57, 202, 209; 320/2-5, 35, 36, 51; 336/232; 136/161

[56] References Cited

U.S. PATENT DOCUMENTS 2,626,971  1/1953  Mansoff ........................ 219/202 UX
3,654,426  4/1972  Brinkmann et al. ................. 320/2 X
3,675,108  7/1972  Nicholl ....................... 320/2
3,938,018  2/1976  Dahl .......................... 320/2
3,991,356  11/1976 Spiteri ....................... 320/2

FOREIGN PATENT DOCUMENTS 1,563,895  6/1970  Germany ..................... 219/209

Primary Examiner—Robert J. Hickey
Attorney, Agent, or Firm—Edward F. Connors

[57] ABSTRACT

A plate of magnetic material is provided in close proximity to a flat transformer in a manner to effectively generate heat due to eddy currents induced in the plate by leakage magnetic flux from the flat transformer, whereby a charger, including the transformer and the plate, can charge a battery while also warming the same.

7 Claims, 5 Drawing Figures

SECONDARY BATTERY CHARGER AND HEATER

This invention relates generally to a secondary battery charger, and more particularly to a charger which charges a secondary battery while also warming the same.

The present invention finds widespread use in the maintenance of batteries on vehicles, especially vehicles with a low working ratio or a specified working period: for example, combines, tractors or other agricultural machinery, fork lift, or fire-fighting vehicles, etc.

It is well known in the art that the capacity of a secondary battery or a fluid type battery changes remarkably with temperature change of the electrolyte confined therein. That is, the battery capacity decreases with falling of the ambient temperature. This is because the chemical reaction of the electrolyte is considerably affected by temperature change.

Therefore, in cold weather with a low ambient temperature, the battery capacity is comparatively reduced during the night period, so that it is often the case that, in the next morning, a starter is not energized sufficiently to enable the engine to start. Furthermore, where a vehicle is left in a garage for a few days, the starting of the engine becomes slow and difficult, or even if the battery of a tractor or a lawn mower has been fully charged before winter for a spring operation, the engine is difficult or unable to start in the spring. The major cause of these engine malfunction are due to the reduction of the battery capacity.

In order to overcome the above described problems, there has been proposed a rapid charging method which utilizes a large current for recharging the battery within a short period of time. However, this method has two inherent drawbacks: that is, the high current is liable to damage the battery and there is a large power consumption.

As an alternative to the above, there has been also proposed another method which charges the battery by feeding an extremely small current thereto for a very long time period. According to this method, however, a very long time is required to charge the battery to a desirable extent, and such a small current is insufficient to effectively charge the battery in cold weather at low temperatures.

In addition, the above two described conventional methods each requires that the operator should prepare a charging device, open a vehicle bonnet, and connect the output terminals of the device to the battery terminals.

A primary object of the present invention is, therefore, to provide an improved secondary battery charger which overcomes the above mentioned problems in the prior art.

Another object of the present invention is to provide an improved secondary battery charger which charges a secondary battery while also warming the same for maximizing its charging efficiency.

Still another object of the present invention is to provide an improved secondary battery charger which supplies a substantially constant current in spite of a variation in voltage of an alternating power source.

A further object of the present invention is to provide an improved secondary battery charger which has a flat configuration in order to be readily installed on the side-wall or underneath a battery inside the engine component.

These and other objects, features and many of the attendant advantages of this invention will be appreciated more readily as the invention becomes better understood by the following detailed description, wherein like parts in each of the several figures are identified by the same reference characters, and wherein:

FIG. 1 is a perspective view, partly broken away, showing a preferred embodiment of the present invention;

FIG. 2 schematically illustrates an electrical circuit diagram of the preferred embodiment of FIG. 1;

Figure 1:
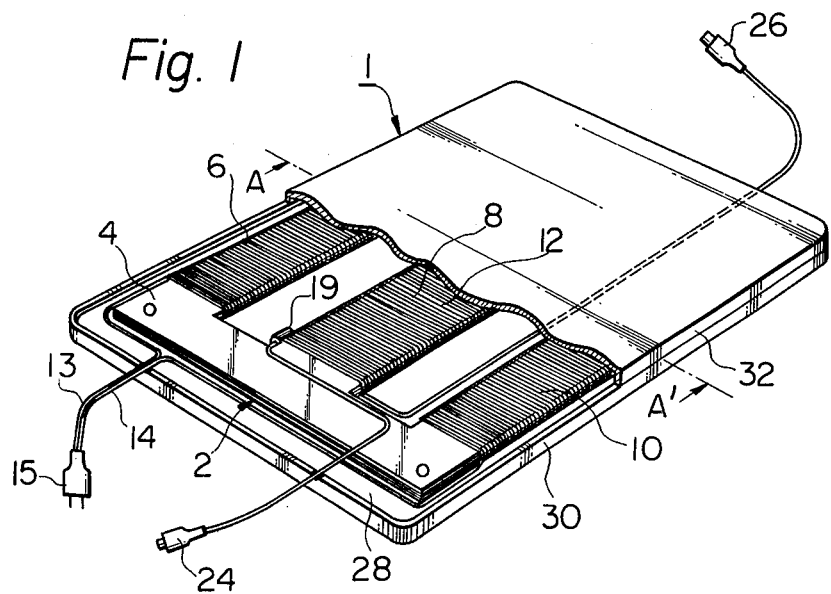
Figure 2:
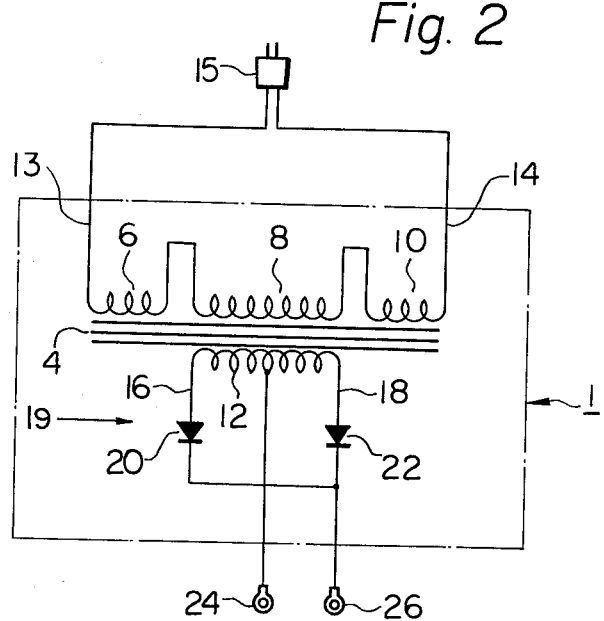

Reference is now made to FIGS. 1–4, in which a secondary battery charger embodying the present invention is illustrated. The secondary battery charger 1 comprises a flat transformer 2. The transformer 2 includes a core 4 which is provided with a primary coils 6, 8, and 10 and a secondary coil 12 as best shown in FIG. 2. The core 4 consists of several laminated plates of magnetic material. Two leads 13 and 14 from the primary coils 6 and 10 are connected to a suitable plug 15 which is connectable to a suitable a.c. power source (not shown). On the other hand, two leads 16 and 18 from the secondary coil 12 are connected to two diodes 20 and 22, respectively. The diodes 20 and 22 rectify the alternating current from the coil 12, feeding the rectified current to a secondary battery 50 (FIG. 5) through output terminals 24 and 26. As shown, a plate 28 of magnetic material is provided in close proximity to or attached to the major face of the core 4 so as to effectively allow the magnetic flux to pass therethrough, which magnetic flux is generated by the coils 6, 8, 10, and 12. The purpose of the provision of the plate 28 is to generate heat by induction therein. The induced heat is, as is well known in the art, produces by eddy currents due to the alternating magnetic field in the plate 28.

The heat induced in the plate 28 serves to warm the electrolyte confined in the battery 50 (FIG. 5), as the secondary battery charger 1 charges the battery, thereby to maximize the charging efficiency. The rectifier assembly 19 consisting of the diodes 20 and 22 is preferably attached to the plate 28 for dissipating heat in the plate 28. This heat from the diodes 20 and 22 is also utilized to warm the electrolyte during the charging operation.

Figure 3:
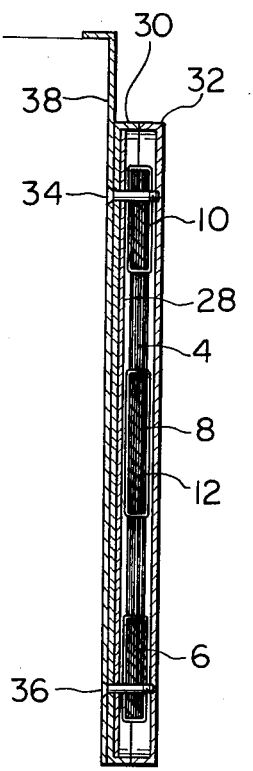
FIG. 3 is a sectional view taken on the line A—A' of FIG. 1, in which a mounting frame is added.

The core 4 and the plate 28 are liquid-tightly covered by covers 30 and 32 which are preferably made of acid-proof material such as suitable plastics. The covers 30 and 32 are fastened to each other by, for example, two or more screws 34 and 36 as shown in FIG. 3, in the case of which also secure a frame 38 to a major face of the transformer 2. The frame 38 is L-shaped for the convenience of mounting the charger 1 on the battery. As an alternative to fastening the covers 30 and 32 by the screws 34 and 36, the core 4 and the plate 28 can be entirely covered by softened plastics in a suitable mold.

Figure 4:
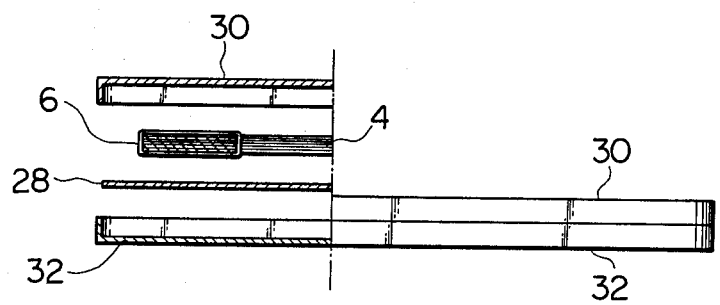
FIG. 4 is a side view, partly exploded and in section, of the preferred embodiment of FIG. 1.

FIG. 4 is a side view, partly exploded and in section, for more clearly showing the preferred embodiment of FIG. 1.

In accordance with the present invention, due to the leakage flux passing through the plate 28, the output voltage from the charger 1 is substantially constant in spite of a variation in voltage of the alternating power source, and furthermore, even if the output terminals 24 and 26 are short circuited, the output current does not increase, so that the temperature rise of the transformer is very small and does not damage or burn the charger 1.

Figure 5:
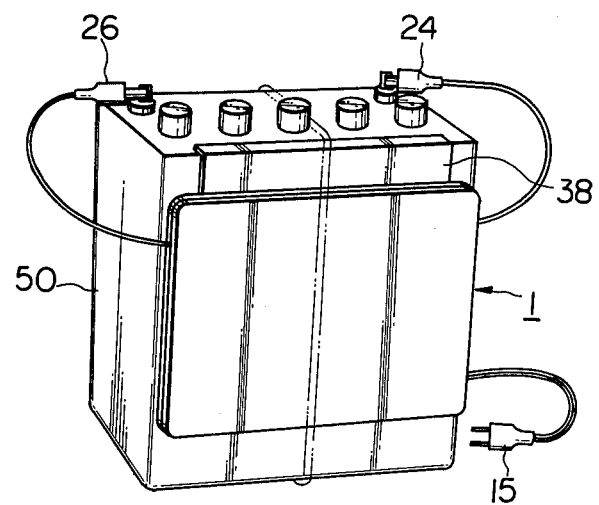
FIG. 5 is a perspective view showing an example of the preferred embodiment of FIG. 1 installed on a battery.

Reference is now made to FIG. 5, in which there is illustrated an example of the installation of the charger 1 on a side wall of the battery 50. As shown, the frame 38 is hung on the top of the battery, and then the charger 1 is secured by a suitable fastening means (not shown).

Alternatively, the charger can be installed underneath the battery 50, although not shown in the drawing. In this case, frame 38 is removed.

The secondary battery charger of the present invention is very effective for maintenance of the batteries on various vehicles.

The present invention has been described in connection with a preferred embodiment; however, it is appreciated that various changes may be made in the various components without departing from the intended scope of the present invention as defined by the appended claims.

What is claimed is:

1. A secondary battery charger including first terminals connectable to a suitable alternating power source and second terminals connectable to a secondary battery, which charger comprises:
   a rectifier connected to one of said second terminals;
   a transformer having a primary coil connected to said first terminals and having a second coil connected to said rectifier; and
   heating means located in thermal contact with the battery, said heating means comprising a magnetic plate provided in close proximity of said transformer in a manner to effectively generate heat due to eddy currents induced in the plate by leakage magnetic flux from said transformer.

2. A secondary battery charger according to claim 1, further comprising a cover which ensures that said secondary battery charger is liquid tight.

3. A secondary battery charger according to claim 2, in which said cover is made of plastics.

4. A secondary battery charger according to claim 2, in which said cover is made of acid-proof material.

5. A secondary battery charger according to claim 2, further comprising a frame secured to one major surface of said cover.

6. A secondary battery charger according to claim 5, in which said holder frame is L-shaped.

7. A secondary battery charger according to claim 1, in which said rectifier is secured to said magnetic plate in order to dissipate its energy loss in the form of heat in said magnetic plate.

* * * * *